106. COMPOSITIONS, COATING OR PLASTIC
80
Patented June 14, 1938

2,120,569

UNITED STATES PATENT OFFICE 2,120,569

SKIN PROTECTANT COMPOSITION

Osmer F. Oliver, Akron, Ohio, assignor to The Tri Dermis Company, Akron, Ohio, a corporation of Ohio No Drawing. Application November 9, 1935, Serial No. 49,115

7 Claims. (Cl. 167—90)

My invention relates to skin protecting compositions. More particularly, it relates to compositions which protect the hands and other parts of the body against non-aqueous materials such as lacquers, paints, varnishes, acids, alkalis, thinners, naphtha, oils, grease, gasoline, printer's ink, dirt, dust, and the like. It also includes the process of preparing such compositions.

Heretofore various skin protecting compositions have been proposed. None, however, for one reason or another is as advantageous for general use as the novel compositions of my invention. For instance, United States Patent No. 1,149,777 to Moore refers to a skin protecting paste or emulsion comprising essentially gum tragacanth, water, glycerine, starch and oil of wintergreen. United States Patent No. 1,574,733 to Kellogg describes a composition comprising bentonite, soap and water. Patent No. 1,697,936 to Teupel discloses a paste of soap, water glass, talcum, water and alcohol. Also, Patent No. 1,516,820 to Johnson and Roberts refers to a composition comprising dextrine, soap, colophony, phenol and water.

Some of the disadvantages of these prior art compositions are their non-elasticity, their stickiness or oiliness, their injuriousness to the skin, their poor protective properties, and their poor keeping properties when not used within a short time after being made.

It is, accordingly, an object of my invention to provide a skin protecting composition which is not subject to these various disadvantages. It is, in particular, an object to provide a composition which forms an invisible "third skin", which is elastic, which will maintain protection of the skin for a period of at least eight hours' continued subjection to dirt, grease, paint, and the like. It is also an object to provide a composition which protects the skin from alkalis or acids. Another object is the provision of a method of preparing my improved composition. Other objects and advantages will become apparent as the description of the invention proceeds.

Briefly, my invention comprises the discovery that a paste or emulsion formed of suitable proportions of a hard soap, a starchy material, an alkali metal silicate, a water soluble oil-resistant emollient and water is an exceptionally efficient skin protectant.

The phenomenal resistance to oils, greases, paints and the like afforded by my composition appears to be provided by the combination of starchy material and water soluble silicate. The starchy material seems to aid in preventing the silicate from drying out, causes the composition to be more adherent to the skin and permits perspiration to pass through the film when applied to the skin without interfering with the properties of the composition. The hard soap (a sodium soap of any of the ordinary soap-forming higher fatty acids, or mixtures thereof, acts as an emulsifier and is a necessary ingredient of my compositions as are also the water soluble emollient and water. The water soluble emollient aids in keeping the composition soft and also is beneficial to the skin. It will be understood that while I have expressed various theories herein as to the actions of the ingredients of my improved compositions, I am not to be limited thereby, but that in any event the combination of said ingredients provides a skin-protecting composition more beneficial than any of those heretofore known.

In its preferred form my improved compositions also contain a small amount of oil which, while not essential, aids in setting the compositions to a more readily usable form. The proportions of the necessary ingredients which I employ may vary as follows:

|  | Ounces |  | Parts by weight |
|---|---|---|---|
| Hard soap | 74– 90 | or | 7.4– 9.0 |
| Alkali metal silicate | 110–180 | or | 11.0–18.0 |
| Starchy material | 10– 15 | or | 1.0– 1.5 |
| Emollient | 65–120 | or | 6.5–12.0 |
| Water | 320–720 | or | 32.0–72.0 |

A more preferred range of proportions of necessary ingredients of my composition is as follows:

|  | Ounces |  | Parts by weight |
|---|---|---|---|
| Hard soap | 77– 85 | or | 7.7– 8.5 |
| Alkali metal silicate | 120–170 | or | 12.0–17.0 |
| Starchy material | 11– 13 | or | 1.1– 1.3 |
| Emollient | 95–105 | or | 9.5–10.5 |
| Water | 480–688 | or | 48.0–68.8 |

Although practically any hard soap may be used in my composition, it is preferable to employ one having a titer sufficiently high to produce fairly long textured gels. In general, a sodium soap having a titer of about 37–43 is quite satisfactory. Lower titer sodium soaps, such as Ivory chips, which is a white, neutral soap made from a combination of fats which is relatively hard and has a titer of 33, are satisfactory but not as good for my new composition as, for example, Amber flakes which is a neutral tallow soap having a minimum anhydrous soap content of 88% and a titer of approximately 42. Another soap found very satisfactory for my purposes is one prepared by the saponification of a mixture of hard fats by sodium silicate and which contains 62–64% soap, 8–10% water, some free silica and some sodium silicate. When this soap is used, it is, of course, necessary to make an adjustment in the formula because of the sodium silicate present in it.

While a hard soap is necessary in my invention and it is not necessary to substitute any other type of soap therefor, it is possible to use in place of some of the hard soap given in the above formulae soft soaps and other emulsifiers. In general, it will not be desirable, however, to reduce the hard soap content below 50% of the total soap content.

The alkali metal silicates employed in my invention may be any of those which are relatively soluble in water, but preferably sodium silicate in the form of water glass. There are many types of water glass available which vary in the ratio of their contents of sodium oxide and silica and in the amount of water in which the silicate of soda is dissolved, and, while any of these may be used in my new composition if care is taken, I prefer to use the ordinary commercial type of water glass having a soda-silica ratio in the neighborhood of 1:3.22. Such a water glass is the "N" brand described in Bulletin No. 1, Copyright 1933, by Philadelphia Quartz Company. A water glass with higher soda ratio should be used only with care in my composition because of the injurious effects of excess alkali on the skin. Furthermore, too much water glass, even of "N" brand, causes the cuticle to stick to the nails when the composition is used on the hands.

The starchy material may be potato starch, rice starch, rice flour, corn starch, wheat starch or any other starchy material which is not too glutinous. In my preferred composition, I have found potato starch to be quite satisfactory.

The water soluble poly hydroxy emollient may be glycerine, glycol, sorbitol, polyglycerol, polyglycol, or the like. Glycerine, however, is preferred. Polyglycerol which may be prepared as described in United States Patent No. 1,846,790 to W. C. Calvert, also has been found to give excellent results.

Further illustrating my invention is one preferred composition which has the following formula:

*Example 1*

| | |
|---|---|
| Sodium soap prepared by the saponification of a mixture of hard fats by sodium silicate which contains 62-64% soap and 8-10% water by weight _____oz__ | 128 |
| Water glass (N brand) _____do__ | 110 |
| Glycerine (C. P.) _____do__ | 100 |
| Potato starch _____do__ | 12 |
| Water (distilled or softened as by borax) _____lbs__ | 32 |
| Cotton seed oil _____oz__ | 3 |
| Perfume _____ | A few drops |

In preparing my compositions I have found that the following procedure is conducive to good results, avoiding precipitation or uneven jelling of the water glass and starch, and permitting duplication of the product from batch to batch. First, heat the glycerine to about 170-220° C. Add to the hot glycerine solution the potato starch, preferably previously wet with water, and mix thoroughly, further external heating not being maintained. The resulting starch-glycerine mixture is water-white in color and appears to be a gel. Then add the starch-glycerine mixture to the water glass, wherein the mixture appears to dissolve. Next dissolve the sodium soap in the water and add this aqueous soap solution to this dispersion or apparent solution and heat the mass to about 35-50° C. Thereafter mix the liquid mass with an aerating paddle at high speed until a volume of about 12 gallons is obtained. Then add the cotton seed oil, mix thoroughly and add the perfume. The composition is then poured into suitable containers and soon sets up to a fine textured, paste-like material.

By heating the glycerine to about 100-120° C. before adding the starch very good results, but not quite as good as by heating it to 170-220° C. are obtained. While other methods may be used in preparing my compositions I have found that best results are obtained by adding wet starch to hot glycerine. While the temperatures indicated are preferred, it will be understood that I am not limited thereby. Of course, it is not desirable to employ such a high temperature that the starch will char or discolor.

This protective material may be easily and quickly applied to any part of the body which is desired to be protected. Merely rub the material thoroughly into the skin before working. Best results are obtained if just enough material is used to form a light film over the skin. This film practically completely vanishes to the eye. If used on the hands it should be rubbed thoroughly around and under the fingernails. It acts as a third skin, preventing harmful substances from entering the pores and thereby eliminating the risk of poisoning. It eliminates the use of abrasives, pumice, strong alkalis and other dangerous solvents heretofore used in cleaning the hands and other parts of the body after work in contact with grease, oils, gasoline, lacquers, paints, etc. It further saves time and washes off easily with water, taking the grime with it.

Other illustrative compositions which have been found satisfactory in the practice of my invention are as follows:

| Ingredients | #2 | #3 | #4 | #5 | #6 | #7 | #8 | #9 | #10 |
|---|---|---|---|---|---|---|---|---|---|
| Sodium soap prepared by the saponification of a mixture of hard fats by sodium silicate (same as in Ex. 1) | 88 oz. | 80 oz. | 110 oz. | 80 oz. | 128 oz. | 128 oz. | 128 oz. | | |
| Sodium soap (Amber flakes) | | | | | | | | | 80 oz. |
| Sodium soap (Ivory flakes) | | | | | | | | 80 oz. | |
| Potassium soap | 48 oz. | 48 oz. | | 48 oz. | | | | | |
| Triethanol amine soap | | | 10 oz. | | | | | | |
| Tinc. green soap | 13 oz. | 12 oz. | | 12 oz. | | | | | |
| Water glass (N brand) | 110 oz. | 128 oz. | 110 oz. | 128 oz. | 110 oz. | 110 oz. | 110 oz. | 158 oz. | 165 oz. |
| Glycerine (C. P.) | 100 oz. | 100 oz. | 100 oz. | 80 oz. | | | 100 oz. | 100 oz. | 100 oz. |
| Glycol | | | | | 90 oz. | 68 oz. | | | |
| Polyglycerol | | | | | | | | | |
| Potato starch | 12 oz. | 12 oz. | 12 oz. | 12 oz. | 12 oz. | 12 oz. | 12 oz. | 12 oz. | 12 oz. |
| Water (borax softened) | 32 lb. | 25 lb. | 42 lb. | 25 lb. | 42 lb. | 42 lb. | 42 lb. | 42 lb. | 42 lb. |
| Cottonseed oil | | | 3 oz. | | 3 oz. | 3 oz. | 3 oz. | 3 oz. | 3 oz. |
| Olive oil | 3 oz. | 2 oz. | | 2 oz. | | | | | |
| Perfume (oil of lavender) | Few drops in each example. | | | | | | | | |

These additional illustrative examples are preferably, although not necessarily, prepared similarly to the process employed in Example 1. The perfume employed is not essential and may be either omitted entirely or varied to suit the taste. Also, any oily material may be used, cotton seed oil and olive oil merely being exemplary. Others are mineral oil, ordinary motor oil, etc.

It will thus be seen that I have provided a very efficient, simply made and simply removed skin protective. I have provided a novel process of preparing my protective composition which may be varied within wide limits insofar as times, temperatures, etc., are concerned, the essential features of the process being the addition of the starch to the hot glycerine. This mixture is then mixed with the other ingredients in any order, although the order previously described appears best. Thus, the starch-glycerine mixture may be mixed with the soap solution and the silicate added thereto if desired. It will also be understood that while the proportions mentioned herein are those preferred by me, I am not to be limited thereby as they may be varied without departing from the scope of the invention or of the appended claims.

What I claim is:

1. A new composition of matter adapted for protecting the skin and like surfaces from grease, oil, paint and the like consisting of an emulsion comprising proportionately a soap in the amount of 74–90 ounces, at least 50 percent by weight being sodium soap, sodium silicate in the amount of 110–180 ounces, glycerine in the amount of 65–120 ounces, starch in the amount of 10–15 ounces, water in the amount of 20–45 pounds, and a few ounces of oil.

2. A new composition of matter adapted for protecting the skin and like surfaces from grease, oil, paint and the like consisting of an emulsion comprising proportionately 128 ounces of a sodium soap prepared by the saponification of a mixture of hard fats by sodium silicate which contains 62–64% soap and 8–10% water by weight, 110 ounces of "N" brand water glass, 100 ounces of glycerine, 12 ounces of potato starch, 32 pounds of softened water, and 3 ounces of oil.

3. A skin protectant consisting of proportionately 77–85 ounces of a sodium soap, 120–170 ounces of water glass, 11–13 ounces of starch, 95–105 ounces of glycerine, 30–43 pounds of water and a few ounces of oil.

4. A new composition of matter adapted for protecting the skin and like surfaces from grease, oil, paint and the like comprising proportionately by weight from approximately 7.7 to approximately 8.5 parts of hard soap, from approximately 12 to approximately 17 parts of sodium silicate, from approximately 1.1 to approximately 1.3 parts of starch, from approximately 9.5 to approximately 10.5 parts of water soluble poly hydroxy emollient, and from approximately 48 to approximately 68.8 parts of water.

5. A new composition of matter adapted for protecting the skin and like surfaces from grease, oil, paint and the like comprising proportionately by weight from approximately 7.7 to approximately 8.5 parts of hard soap, from approximately 12 to approximately 17 parts of sodium silicate, from approximately 1.1 to approximately 1.3 parts of starch, from approximately 9.5 to approximately 10.5 parts of water soluble poly hydroxy emollient, from approximately 48 to approximately 68.8 parts of water, and approximately .3 part of oil.

6. A new composition of matter adapted for protecting the skin and like surfaces from grease, oil, paint and the like comprising proportionately by weight from approximately 7.4 to approximately 9 parts of hard soap, from approximately 11 to approximately 18 parts of water soluble alkali metal silicate, from approximately 1 to approximately 1.5 parts of starchy material, from approximately 6.5 to approximately 12 parts of water soluble poly hydroxy emollient, and from approximately 32 to approximately 72 parts of water.

7. A new composition of matter adapted for protecting the skin and like surfaces from grease, oil, paint and the like comprising proportionately by weight approximately 8 parts of sodium soap, approximately 13 parts of water glass, approximately 1.2 parts of potato starch, approximately 10 parts of glycerine, approximately 51 parts of water and approximately .3 part of oil.

OSMER F. OLIVER.